United States Patent Office 2,801,117
Patented July 30, 1957

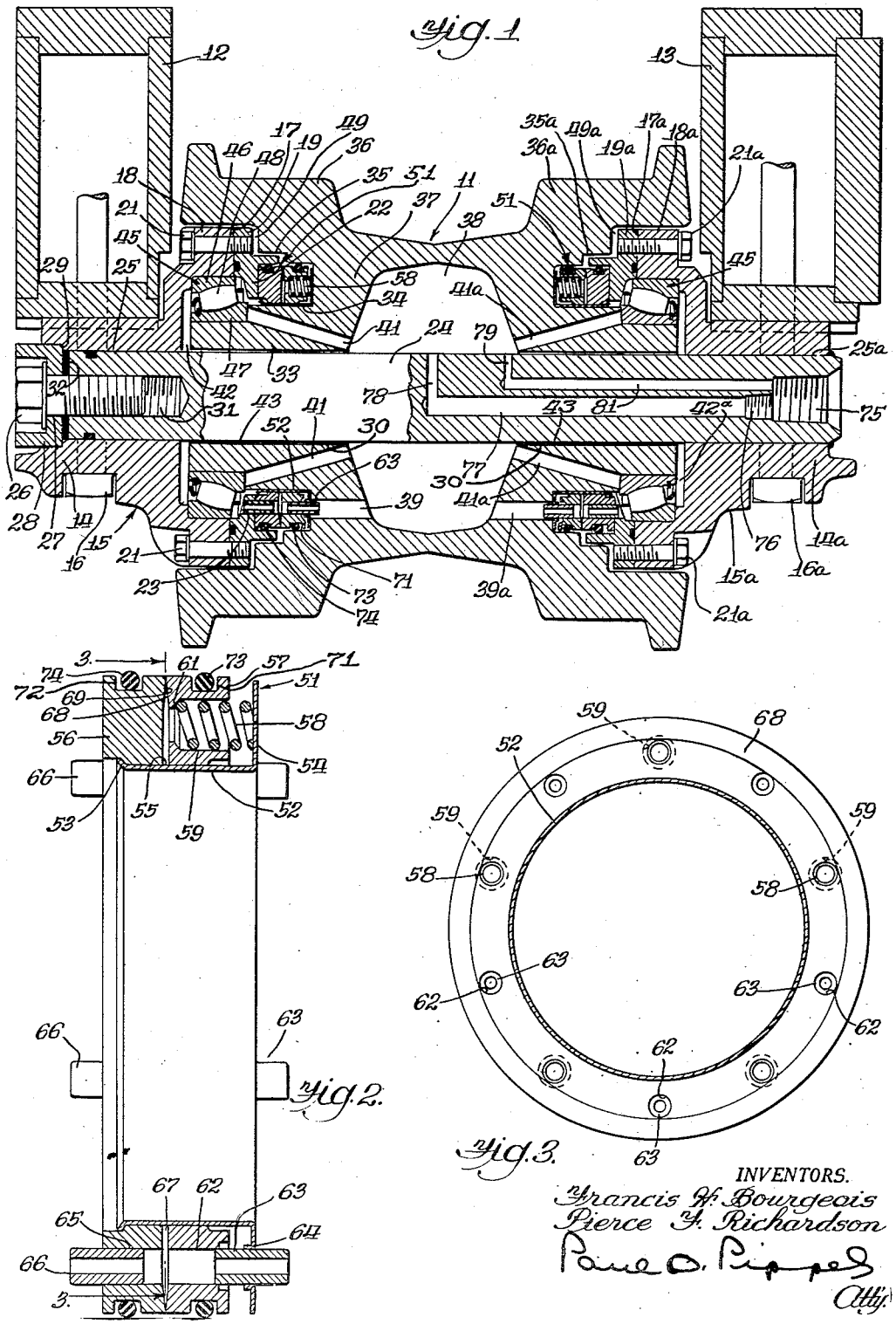

2,801,117

ROTARY SEAL WITH RADIALLY CONTACTING SEALING FACES

Francis H. Bourgeois, Elmhurst, and Pierce F. Richardson, Downers Grove, Ill., assignors to International Harvester Company, a corporation of New Jersey Application November 24, 1954, Serial No. 471,036

6 Claims. (Cl. 286—8)

This invention concerns seals utilized between relatively rotatable parts maintained in coaxial relation by a bearing, to exclude dirt or abrasive particles of other foreign material from the bearing and to confine lubricant within a space enclosing the bearing, and more particularly concerns such a seal wherein there are relatively rotatable sealing rings having annular sealing faces in sliding sealing relation.

Seals constructed according to the present invention are adapted for sealing the lubricating space containing anti-friction bearings upon which track rollers for the track of a crawler type vehicle are mounted. Inordinately effective and durable seals are required for this purpose because the track rollers of crawler tractors roll upon the ground-engaging flight of the endless articulated tracks where these rollers are subjected to dust when the vehicle is operating under dry conditions, and are sometimes submerged in mud and water when operating in the vicinity of ponds and streams, or after rainfall. A hermetic seal is imperative to exclude foreign particles from the track roller bearings during these conditions of adverse operating environment.

The objects of this invention include:

The provision of a seal unit having annular sealing rings mounted upon an annular carrier where these rings are relatively rotatable and including spring means reacting against a portion of the carrier to press opposed annular sealing faces of the rings into sliding sealing relation while also urging the rings endwise toward an end of the carrier.

The provision of a sealing unit wherein annular mated sealing faces of relatively rotatable sealing rings are maintained in engagement from the time of their initial assembly at the factory so these sealing faces cannot be accidently scratched or otherwise impaired prior to installation of the seal in association with the bearing to be protected.

The provision of a seal unit having a carrier whereon sealing rings, while maintaining sealing surfaces thereof in continuous contact, are axially movable to accommodate adjustment of the relatively rotatable parts supported by the bearing which the seal protects, such adjustment sometimes being necessary after wear of the bearing has occured.

The provision of a bearing seal unit provided with means for supplying lubricant to the sliding sealing faces thereof.

The provision of an improved seal including lubricant conducting passages extending axially therethrough to facilitate passage of lubricant to the bearing from which the seal excludes foreign abrasive particles.

The provision of a seal according to the next preceding object wherein there are tubular pins respectively in the sealing rings for keying these rings respectively to relatively rotatable parts between which the bearing is installed, and wherein these tubular pins are conductive of lubricant from a lubricant-containing reservoir in one of the relatively rotatable parts to said bearing.

The above and other desirable objects inherent in and encompassed by the invention are elucidated in the ensuing description, the appended claims, and the annexed drawings, wherein:

Fig. 1 is a sectional view taken transversely through a crawler tractor track frame and axially through a track roller mounted in such frame, and showing, in section, the bearings upon which the track roller is journalled, and seal structures, each constituting a preferred embodiment of the present invention incorporated into the roller structure.

Fig. 2 is a sectional view taken axially through one of the seal units of Fig. 1, showing the parts thereof in their relative positions occupied prior to installation in the track roller.

Fig. 3 is a transverse sectional view taken on the line 3—3 of Fig. 2.

Referring now to Fig. 1, a track roller 11 is shown mounted between two track frame members 12 and 13 of a track frame structure which is typical of that disposed at each side of a crawler tractor vehicle, not shown. Such a track frame structure employs several track rollers, as that shown at 11, spaced apart lengthwise thereof for rolling upon the ground-engaging flight of an endless articulated track, not shown.

Referring first to the track frame member 12, a hub 14 of a bearing supporting member 15 is secured to the lower side of such frame member 12 by bolts 16, of which one is shown. Member 15 has an axially extending annular flange structure 17 which comprises a portion 18 integral with the hub 14, and a ring portion 19 held mounted upon such portion 18 by a circle of cap screws 21. The flange structure ring 19 has a radially inwardly projecting lip 22 containing a plurality of circumferentially spaced holes 23 which extend axially of the roller 11.

The track frame member 13 has mounted thereon a bearing supporting member 15a, similar to the bearing-supporting member 15 and secured in place by cap screws 16a. The components of the bearing-supporting member 15a corresponding to those already described with respect to the member 15 are identified by the same respective reference characters with the suffix "a."

A shaft 24 is nonrotatively mounted in hub bores 25 and 25a of the bearing-supporting members 15 and 15a. A cap screw 26 inserted through a hole 27 in a short bar 28, seated at 29 in the outer end of the hub 14, is turned into a threaded bore 31 in the left end of the shaft 24 and cooperates with a selective number of shims 32 for maintaining the shaft 24 in a selected endwise position in the track frame 12—13.

The track roller is symmetrically constructed. This roller has an axial bore slightly over-size with respect to the shaft 24 about which it is coaxially disposed. The left end of the roller 11 has a hub 33 with a radially outer periphery 34 in radially opposed and spaced relation with a stepped radially inner periphery 35 of a track-engaging rim 36. A roller web 37 extends radially between the hub 33 and the rim 36. A lubricant containing cavity 38 occupies the center inner portion of the track roller. A plurality of lubricant-conducting passages 39 spaced circumferentially of the roller extend axially thereof through the web 37. Bearing knock-out bores 41 extend axially of the roller through the hub 33. The left outer end of the hub 33 is spaced from the bearing-supporting member 15 to provide a lubricant-receiving space 42 surrounding the shaft 24. Communication axially of the roller is provided between the space 42 and the cavity 38 by the annular passage means 43 provided by the space between the shaft 24 and that portion of the roller bore 30 within the hub 33.

Roller 11 is supported at its opposite ends by identical roller bearing units 45. The bearing unit shown at the left, in Fig. 1, can be seen to have an outer race 46 supported in the inner periphery of the flange structure 17, an inner race 47 supported upon the outer periphery of the roller hub 33 and bearing roller elements 48 disposed conventionally between these two races. These roller bearing units 45 are protected or isolated from foreign particles to which they might otherwise be subjected through labyrinth passages 49, 49a formed between the stepped inner peripheries 35, 35a, of the roller rims 36, 36a and the correspondingly stepped outer peripheries of the non-rotatable flange structures 17, 17a, by seal structures 51.

One of the seal structures 51 is shown in detail in Figs. 2 and 3. This seal structure comprises an annular retainer member 52 which may be spun into shape from a piece of sheet metal tubing to effect an abutment flange 53 at one end and a spring reaction flange 54 at its opposite end. The cylindrical outer periphery 55 of the retainer member 52 rotatively carries a sealing ring 56 and also carries a companion sealing ring 57. Both sealing rings 56, 57 are slidable axially upon the retainer ring and before installation in the track roller these rings occupy a leftward position shown in Fig. 2 where the ring 56 abuts against the flange 53, a plurality of circumferentially spaced helical springs 58 reacting against the flange 54 for urging the sealing rings leftward. The ring 57 most proximate to the flange 54 contains a plurality of circumferentially spaced, axial bores 59, each containing a spring seat 61 for a respective one of the springs 58. Alternating with the bores 59 in the ring 57 are axial bores or holes 62 in which tubular keying pins 63 are respectively slidably disposed with a small clearance. These keying pins extend axially through respective holes 64 in the spring reaction flange 54 wherein these pins are anchored. Holes 65 spaced circumferentially about the sealing ring 56 and communicating axially therethrough are adapted to receive respective tubular keying pins 66 with a slight clearance. These pins are anchored in the holes 23 of the flange structure annular lip 22. The tubular lubricant-receiving cavity 67 formed between opposed axially spaced inner end portions of the sealing rings 56, 57 are communicated with by the tubular keying pins 63 and 66. Annular sealing surfaces 68 and 69 respectively upon the opposed inner ends of the rings 56 and 57 are in sliding sealing relation. These annular sealing surfaces 68 and 69 initially make line contact against their radially outermost portions and diverge slightly apart radially inwardly from the annular line of contact. This arrangement increases the unit area pressure between the sealing faces of the rings and diminishes the likelihood of foreign particles entering therebetween for contaminating lubricant for this seal and for the roller supporting bearings.

In the left-hand portion of Fig. 1 it can be seen that the tubular keying pins 63 extend into the roller lubricant passages 39 and thereby constrain the retainer member 52 against spinning on the roller and also similarly constrain the sealing ring 57. The tubular keying pins 66 which are anchored in the holes 23 in the annular lip 22 of the non-rotatable flange component 19 hold the sealing ring 56 against rotation, while the companion sealing ring 57 is constrained by the tubular keying pins 63 for rotation relatively thereto with the roller 11.

The cylindrical outer periphery of the sealing ring 56 has an O-ring receiving groove 72 and a similar groove 71 is formed in the cylindrical outer periphery of the sealing ring 57. An O-ring 73 disposed in the groove 71 presses against a portion of the stepped inner periphery 35 of the roller rim 36, whereas an O-ring 74 in the groove 72 presses against a cylindrical portion of the ring component 19 of the flange structure 17. These two O-rings 73 and 74 are thus cooperative with the opposed slidingly engaged sealing faces 68 and 69 of the rings 57 and 56 to prevent communication between the labyrinth passage 49 and the lubricant filled space containing the leftmost roller bearing unit 45. The labyrinth passage 49a at the right end of the tractor is similarly sealed off by the sealing unit 51 associated therewith.

Lubricant is forced into the roller cavity 38 by means of a "grease-gun," not shown, of which a tip is insertable through a threaded recess 75 in the right end of the shaft 24 and placed in threaded relation with a countersunk recess 76. Operation of the "grease-gun" forces lubricant inwardly through the passage 77 and the lateral 78 thereof into the cavity 38. After the cavity 38 becomes filled this fact is manifested to the operator by lubricant pouring out of the cavity through the channel lateral 79 and channel 81 from which the excess lubricant will spew into view of the operator within the threaded recess 75. After filling the cavity 38 the operator will disconnect the "grease-gun" from the recess 76 and close the cavity 75 by a threaded plug, not shown.

While the roller 11 is at rest some of the lubricant will pour through the lowermost axial passages 39 and 39a and thence through the tubular keying pins 63 into the annular lubricant receiving spaces 67 between the sealing rings of the sealing units 51. Some of the lubricant will also pour through the annular passage 43 into the annular spaces 42 and 42a for lubricating the rollers of the roller bearing units. When the roller is rotated part of the lubricant in the spaces 42 and 42a will be pumped by the bearing rollers 48 through the tubular keying pins 66 and into the annular cavities 67 of the sealing units 51. In this manner the bearing units 45 and sealing units 51 are copiously lubricated.

In Fig. 1 it will be noted that the capscrew 26 when tightened is operable to advance the bearing supporting structure 15 rightward a distance determined by the number of shims 32 between the bar 28 and the left end of the shaft 24. The hub 14a of the bearing supporting member 15a is axially fixed with respect to the right end of the shaft 24. Consequently when the capscrew 26 is screwed into the shaft 24 the distance between bearing supporting members 15 and 15a is diminished attendant to which the sealing rings 56 of the sealing units 51 are moved axially upon the retaining rings 52 while compressing the springs 58. Thus the sealing unit rings 56 are spaced axially from the abutment flanges 53 therefor. This adjustment of the sealing units 51 makes it possible to tighten the capscrew 26 until proper axial preloading is placed upon the roller bearing units 45. As wear occurs in the roller bearing units it becomes advisable to again establish the desired preloading therein and this is accomplished by removing the capscrew 26 and removing some of the shims 32 before replacement of such screw and retightening it. When this occurs the springs 58 adapt the sealing units 51 to be further compressed.

Having thus described a single embodiment of the invention with the view of clearly and concisely illustrating the same, we claim:

1. In a rotary seal, an annular retainer member having a cylindrical exterior surface, an abutment flange projecting radially outwardly from one end of said surface and a spring reaction flange projecting radially outwardly from the opposite end of said surface, axially contiguous sealing rings having respective internal cylindrical surfaces mounted in sliding sealing relation upon said surface and having coacting and abutting annular sealing surfaces in slidable sealing relation upon inner opposed ends thereof, one of said rings being rotatable upon the retainer member surface and abuttable against the abutment flange, both of said rings being slidable axially of said surface, spring means reacting between the spring reaction flange and the other ring for pressing the sealing surfaces together and constantly urging the rings endwise toward the abutment flange, the opposed inner ends of the sealing rings having opposed axially spaced portions forming a lubricant-receiving cavity radially inwardly from the annular sealing faces, and the ring most proximate to the spring reaction flange contains a plurality of bores communicating axially therethrough into communication with said cavity.

2. The combination set forth in claim 1 wherein certain of said axially communicating bores contain spring seats, and wherein said spring means comprises small helical springs disposed partially within such bores and reacting between such seats and the spring reaction flange.

3. The combination set forth in claim 2 wherein the spring reaction flange contains openings respectively registering axially with certain other of the bores of said most proximate ring and wherein there are tubular keying pins disposed partially within said certain other bores and projecting axially outwardly respectively through said openings in the spring reaction flange.

4. In a rotary seal, an annular retainer member having a cylindrical exterior surface, an abutment flange projecting radially outwardly from one end of said surface and a spring reaction flange projecting radially outwardly from the opposite end of said surface, axially contiguous sealing rings having respective internal cylindrical surfaces mounted in sliding sealing relation upon said surface and having coacting and abutting annular sealing surfaces in slidable sealing relation upon inner opposed ends thereof, one of said rings being rotatable upon the retainer member surface and abuttable against the abutment flange, both of said rings being slidable axially of said surface, spring means reacting between the spring reaction flange and the other ring for pressing the sealing surfaces together and constantly urging the rings endwise toward the abutment flange, the opposed inner ends of the sealing rings having opposed axially spaced portions forming a lubricant-receiving cavity radially inwardly from the annular sealing faces, the sealing ring most proximate to the abutment flange contains a plurality of bores communicating axially therethrough into communication with said cavity, and a plurality of tubular keying pins mounted respectively in said bores and projecting axially outwardly from said most proximate ring.

5. In a rotary seal, an annular retainer member having a cylindrical exterior surface, an abutment flange projecting radially outwardly from one end of said surface and a spring reaction flange projecting radially outwardly from the opposite end of said surface, axially contiguous sealing rings having respective internal cylindrical surfaces mounted in sliding sealing relation upon said surface and having coacting abutting annular sealing faces in slidable sealing relation upon inner opposed ends thereof, the opposed inner ends of said sealing rings having axially spaced portions forming a lubricant-receiving cavity radially inwardly from the annular sealing faces, said rings containing bores communicative axially therethrough into communication with said cavity, the sealing ring most proximate to the abutment flange being rotatable upon the retainer member surface and abuttable against the abutment flange, both of said rings being slidable axially of said surface, spring means reacting between the spring reaction flange and the other ring for pressing the sealing faces together and constantly urging the rings endwise toward the abutment flange, the spring reaction flange containing openings respectively registering axially with certain of the bores in the sealing ring most proximate to such flange, and a plurality of tubular keying pins disposed partially within said certain bores and projecting axially outwardly respectively through the registering openings in the spring reaction flange.

6. In a rotary seal, an annular retainer member having a cylindrical exterior surface, abutment flange means projecting radially outwardly generally from one end of said surface and spring reaction flange means projecting radially outwardly from the opposite end of said surface, the spring reaction flange means having holes spaced circumferentially of the retainer member and having their principal axes extending axially of such member, axially contiguous sealing rings having respective internal cylindrical surfaces mounted in sliding sealing relation upon said surface and having coacting abutting annular sealing faces in slidable sealing relation upon inner opposed ends thereof, the opposed inner ends of the sealing rings having opposed axially spaced portions forming a lubricant-receiving cavity radially inwardly from the annular sealing faces, the sealing ring most proximate to the abutment flange means being rotatable upon the retainer member surface and abuttable against the abutment flange means, both of said rings being slidable axially of said surface, and springs means reacting between the spring reaction flange means and the ring most proximate to such spring reaction flange means for pressing the annular sealing faces together and constantly urging the rings endwise toward the abutment flange means, each of said rings having a plurality of circumferentially spaced bores communicating axially therethrough from the lubricant-receiving cavity to the outer ends of such rings the bores in the ring most proximate to the spring reaction flange being in registry with circumferentially spaced holes of said flange, and tubular keying pins disposed respectively in said bores and projecting endwise outwardly from the rings respectively containing such bores, and the pins in the ring adjacent to the spring reaction flange means projecting through the registering holes in such flange means.

References Cited in the file of this patent

UNITED STATES PATENTS

| | | |
|---|---|---|
| 2,265,953 | Mortensen et al | Dec. 9, 1941 |
| 2,470,419 | Voytech | May 17, 1949 |
| 2,489,781 | Isenbarger | Nov. 29, 1949 |
| 2,612,390 | Lewis | Sept. 30, 1952 |
| 2,639,170 | Schick et al | May 19, 1953 |
| 2,690,933 | Bechman | Oct. 5, 1954 |
| 2,736,624 | Schoenrock | Feb. 28, 1956 |